June 24, 1924.
W. N. ONDERDONK
1,498,567
STEERING COLUMN SUPPORT FOR AUTOMOBILES
Filed June 19, 1919
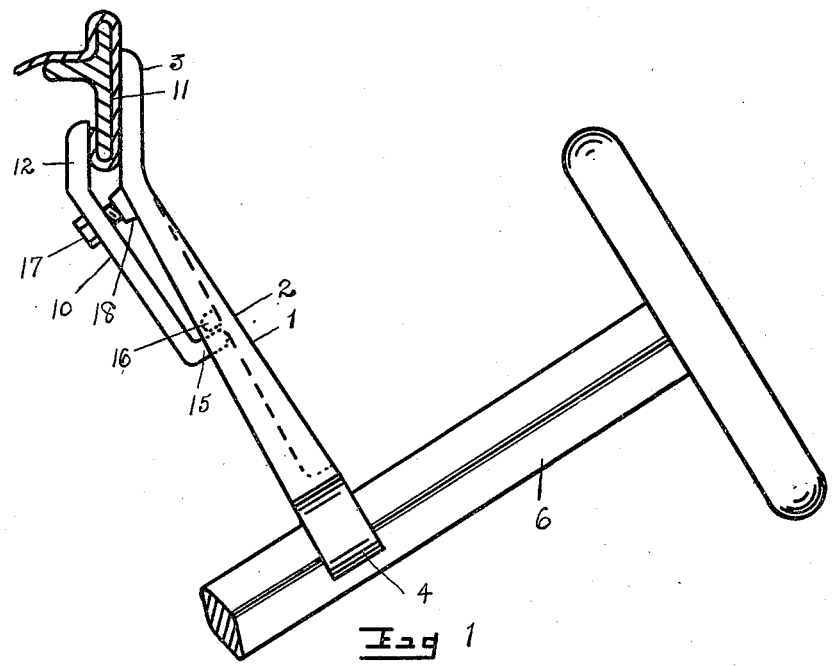
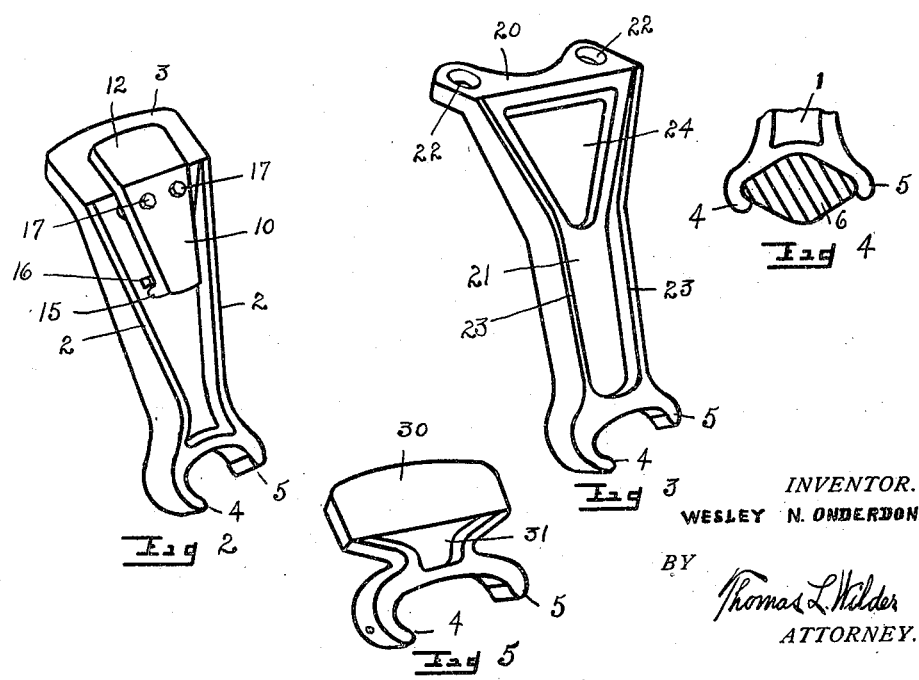
INVENTOR.
WESLEY N. ONDERDONK
BY
Thomas L. Wilder
ATTORNEY.

Patented June 24, 1924.

1,498,567

UNITED STATES PATENT OFFICE.

WESLEY N. ONDERDONK, OF HERKIMER, NEW YORK.

STEERING-COLUMN SUPPORT FOR AUTOMOBILES.

Application filed June 19, 1919. Serial No. 305,273.

*To all whom it may concern:*

Be it known that I, WESLEY N. ONDER-DONK, a citizen of the United States, residing at Herkimer, in the county of Herkimer and State of New York, have invented certain new and useful Improvements in Steering-Column Supports for Automobiles, of which the following is a specification, reference being had therein to the accompanying drawing.

My invention relates to a steering column support for automobiles and I declare the following to be a full, clear, concise and exact description thereof sufficient to enable any one skilled in the art to which it appertains to make and use the same reference being had to the accompanying drawings in which like reference characters refer to like parts throughout the specification.
The object of the invention is to provide a support for the steering column of an automobile. The one here shown is adapted more particularly for Ford automobiles. The support has a fork that is so shaped as to engage and hold the column without the employment of bolts or other fastening means. It can be attached and detached by the mere movement of the support relative to the column.
The object will be understood by referring to the drawings in which:

Fig. 1 is a side elevation of the support, showing the same supporting the steering column of an automobile;
Fig. 2 is a perspective view of the support on a reduced scale;

Fig. 3 is a perspective view of a modified form of support;

Fig. 4 is a fragmentary detail view, showing the fork of the support in engagement with the steering column in section;

Fig. 5 is a perspective view of a still further modified form of the support.

Referring more particularly to the drawings, the support comprises a body portion —1— having lateral ribs 2—2 which tend to strengthen the support. The upper part 3 of the body —1— is formed on an angle to the body —1—, whereby to conform the support to the proper conformation adapted for its use on the automobile. The body —1— tapers toward its opposite end and has there formed a fork with one prong 4 extending around in substantially the arc of a circle, whereas the other prong 5 is shorter and provided with a plane surface extending along a straight line adapted to pass slightly beyond the center of the steering column 6, when attaching said support to the column 6.

The prongs 4 and 5 of the fork are so made that by engaging first the prong 4 with two sides of the quadrilateral shaped steering column 6, the support may be turned then bodily so that the prong 5 will engage the opposite two sides and lock the fork with the column 6. The support may be detached by moving the same so as to disengage first the prong 5 and then the prong 4.

A clamp 10 cooperates with the body —1— of the support, whereby to secure the body to the cowl 11 of an automobile body, not here shown. For this purpose, the upper end 12 of the clamp 10 makes contact with one side of the cowl 11 and the upper part 3 of the body —1— of the support makes contact with the other side thereof. The lower end of the clamp 10 has a toe 15 that is adapted to engage a flange 16 formed integral with the body —1—.

The clamp 10 is held to the body —1—, whereby to secure the body —1— to the cowl 11 by the bolts 17—17 which project through suitable apertures formed in the clamp 10 and engage the threaded orifices formed in the sockets 18—18 made integral with the body —1— of the support.

The modification shown in Fig. 3 avoids the use of the clamp 10 and employs instead a part 20 formed at an angle to the part 21 and equipped with two apertures 22—22 for the mounting of bolts that secure the support to the cowl 11. The part 21 has lateral ribs 23—23 for strengthening the support in the location where strength is most needed and a recess 24 for lightening the same.

The modification illustrated in Fig. 5 is used to span a very short distance between the cowl 11 and the steering column 6. The part 30 that is formed at an angle to the part 31 is bolted, clamped or otherwise secured to the cowl 11. The part 30 may be provided with bolt holes, similar to the bolt holes 22 of the part 20, shown in Fig. 3.

Having thus described by invention, what I claim as new and desire to secure by Letters Patent is:

1. In a steering column support for automobiles, a member having an open fork with one prong extending around in the arc of a circle and the other extending along a straight line adapted to engage said steering column in a removable manner, and a clamp for securing said member to the cowl of an automobile.

2. In a steering column support for automobiles, a member having a fork for engaging said steering column in a removable manner, a flange on said member, and a clamp having a toe for engaging the flange on said member, whereby to hold said member to the cowl of an automobile.

3. In a steering column support for automobiles, a member having a fork for engaging said steering column in a removable manner, the upper part of said member being formed on an angle to the lower part, a flange on said member, a clamp, and a toe on said clamp adapted to engage the flange on said member, whereby to hold said member to the cowl of an automobile.

In testimony whereof I have affixed my signature.

WESLEY N. ONDERDONK.